(12) United States Patent
Oglesby et al.

(10) Patent No.: US 6,874,498 B2
(45) Date of Patent: Apr. 5, 2005

(54) GAS POWERED SOLDERING TOOL

(75) Inventors: Alfred Peter Oglesby, Carlow (IE); John Paul Oglesby, Carlow (IE)

(73) Assignee: Oglesby & Butler Research & Development Limited, Carlow (IE)

( * ) Notice: Subject to any disclaimer, the term of this patent is extended or adjusted under 35 U.S.C. 154(b) by 0 days.

(21) Appl. No.: 10/398,939

(22) PCT Filed: Oct. 12, 2001

(86) PCT No.: PCT/IE01/00130
§ 371 (c)(1), (2), (4) Date: Apr. 11, 2003

(87) PCT Pub. No.: WO02/30606
PCT Pub. Date: Apr. 18, 2002

(65) Prior Publication Data
US 2004/0043347 A1 Mar. 4, 2004

(30) Foreign Application Priority Data
Oct. 13, 2000 (IE) .......................................... S2000/0827

(51) Int. Cl.[7] ............................................... F23K 3/02
(52) U.S. Cl. ........................... 126/414; 126/406; 431/7; 431/268; 431/328
(58) Field of Search ................................ 126/413, 414, 126/406; 431/354, 268, 328, 7, 345

(56) References Cited

U.S. PATENT DOCUMENTS

| 4,133,301 A | 1/1979 | Fujiwara |
| 5,771,881 A | 6/1998 | Oglesby et al. |

FOREIGN PATENT DOCUMENTS

EP       0 118 282 A       9/1984

*Primary Examiner*—Jiping Lu
(74) *Attorney, Agent, or Firm*—Sughrue Mion, PLLC

(57) ABSTRACT

A gas powered soldering tool (1) comprising a handle (2) and a tubular carrier member (15) extending therefrom. A combustion chamber (22) is formed in a distal end (19) of the carrier member (15) within which a catalytic combustion element (23) of cylindrical construction is located. Fuel gas/air mixture is supplied to the combustion chamber (22) through the carrier member (15). A receiving member (30) is crimped onto the carrier member (15) at the distal end thereof and releasably carries a soldering tip tool (18). A spigot (40) extending from the soldering tip tool (18) into the combustion chamber (22) conducts heat from the combustion chamber (22) to a soldering tip portion (36) of the soldering tool tip (18). A plug member (37) of the soldering tool tip (18) is threaded for engaging corresponding threads in a bore (31) of the receiving member (30) for facilitating replacement of the soldering tool (18). The soldering tool (18) can be replaced without the need for replacing the catalytic combustion element (23) and without the risk of damage to the catalytic combustion element (23).

25 Claims, 3 Drawing Sheets

GAS POWERED SOLDERING TOOL

Figure 1:
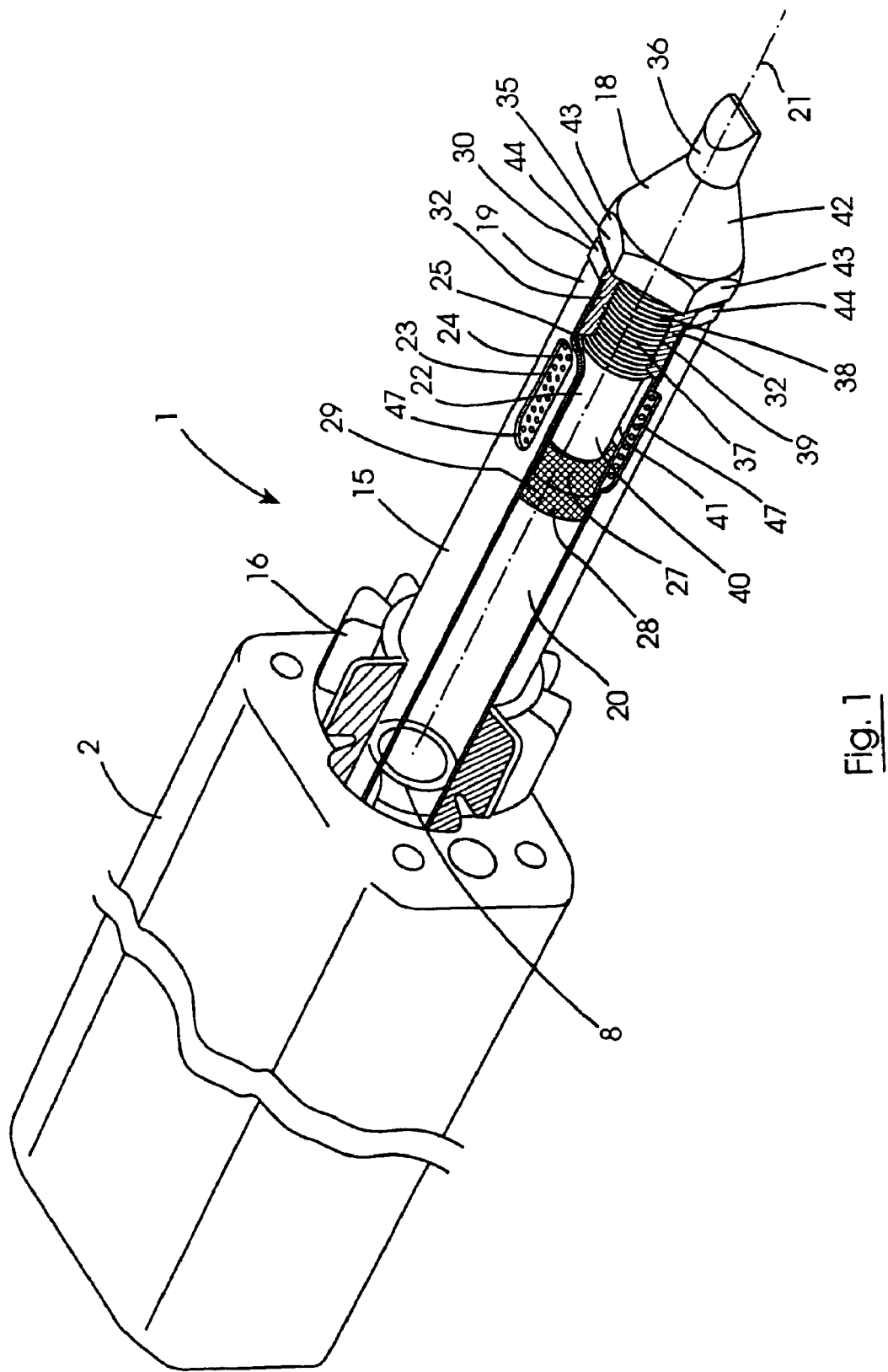

This is a National Stage Entry of Application No. PCT/IE01/00130 filed Oct. 12, 2001, the disclosure of which is incorporated herein by reference.

The present invention relates to a gas powered soldering tool, and in particular, though not limited to a hand held portable gas powered soldering tool.

Gas powered soldering tools typically comprise a handle, and a tubular carrier member extending from the handle for carrying a soldering tip tool. The soldering tip tool typically comprises a soldering tip portion for soldering which extends from a body member within which a combustion chamber is formed. A gas catalytic combustion heating element is located in the combustion chamber for heating the soldering tip tool, and a spigot may extend into the combustion chamber for facilitating heat transfer from the combustion chamber to the soldering tip portion. A fuel gas/air mixture is delivered through the carrier member to the combustion chamber for converting to heat by the catalytic combustion element. The fuel gas may be supplied from a fuel gas reservoir located in the handle where the soldering tool is portable, or from an external fuel gas reservoir where the soldering tool is not portable. Such portable soldering tools are disclosed in U.S. Pat. No. 4,133,301 of Fujiwara and European Patent Specification No. 118,282 of Oglesby, et al.

One disadvantage of such soldering tools is encountered when it is desired to replace a soldering tip tool. Because the combustion chamber is located in the soldering tip tool, and forms an integral part thereof, if one wishes to replace a soldering tip tool, the gas catalytic combustion element must automatically be replaced with the soldering tip tool. In many cases the catalytic combustion element of a spent or damaged soldering tip tool may be perfectly operational, and thus in disposing of a spent or damaged soldering tip tool, one is forced to dispense with the catalytic combustion element. This is undesirable, since it is wasteful of catalytic combustion elements. A further and possibly greater disadvantage occurs if one wishes to supply a gas powered soldering tool with a plurality of soldering tip tools, for example, soldering tip tools of different sizes and shapes of soldering tip portions. In such cases, it is necessary to supply a separate catalytic combustion element in the combustion chamber of each soldering tip tool. This leads to significant unnecessary expense.

Attempts have been made to overcome this disadvantage of known soldering tools without any significant success. One soldering tool which attempts to overcome this disadvantage requires the combustion chamber, and in turn the gas catalytic combustion element to be located a considerable distance from the soldering tip portion of the soldering tip tool, thus leading to poor and inefficient heat transfer. An alternative attempt to overcome the disadvantage of known gas powered soldering tools requires that the gas catalytic combustion element be exposed while the soldering tip tool is being replaced. This is entirely unsatisfactory, since it leads to damage of the catalytic combustion element during replacing of one soldering tip tool with another.

There is therefore a need for a gas powered soldering tool, and indeed, for a soldering tip tool for such a gas powered soldering tool which overcomes this disadvantage of known gas powered soldering tools. The present invention is directed towards providing such a gas powered soldering tool, and a soldering tip tool.

According to the invention there is provided a gas powered soldering tool comprising a handle, a soldering tip tool having a soldering tip portion extending at one end thereof and an elongated spigot extending at the opposite end thereof, an elongated tubular carrier member extending from the handle for carrying the soldering tip tool at a distal end thereof, the carrier member having an elongated bore extending therethrough defining a main central axis, and forming an elongated combustion chamber towards the distal end thereof, a gas catalytic combustion heating element for converting gas to heat for heating the soldering tip tool, the catalytic combustion element having a longitudinally extending bore defining a central bore axis, and being located in the combustion chamber with the central bore axis extending parallel to the main central axis, a receiving means located at the distal end of the carrier member for receiving and securing the soldering tip tool to the carrier member with the spigot of the soldering tip tool extending into the bore of the catalytic combustion element for transferring heat from the catalytic combustion element to the soldering tip portion, and a fuel gas supply means located in the handle for supplying fuel gas to the combustion chamber through the carrier member, wherein the receiving means is a releasable receiving means for releasably receiving and securing the soldering tip tool in the carrier member.

In one embodiment of the invention the receiving means comprises an annular receiving member having a receiving bore for releasably receiving and engaging the soldering tip tool. Preferably, the receiving bore is provided with an internal screw thread for engaging a corresponding external screw thread on the soldering tip tool. Advantageously, the annular receiving member engages the bore of the carrier member. Ideally, the carrier member is crimped onto the annular receiving member.

In one embodiment of the invention at least a pair of opposite spanner engaging flats are provided on the annular receiving member for facilitating gripping of the annular receiving member with a spanner. In another embodiment of the invention at least a pair of opposite spanner engaging flats are provided on the soldering tip tool for facilitating gripping of the soldering tip tool with a spanner, and for facilitating rotation of the soldering tip tool relative to the annular receiving member for removal of the soldering tip tool from the carrier member.

In a further embodiment of the invention the receiving means forms a flange extending inwardly into the combustion chamber for locating the catalytic combustion element in the combustion chamber. Preferably, the flange formed by the receiving means extends around the soldering tip tool.

In one embodiment of the invention a partition is located in and extends across the bore of the carrier member intermediate the ends thereof for permitting passage of fuel gas through the bore of the carrier member into the combustion chamber, and for preventing debris from the combustion chamber passing in the reverse direction through the bore of the carrier member. Preferably, the partition defines the combustion chamber in the bore of the carrier member towards the distal end thereof. Advantageously, the partition co-operates with the receiving means for locating the catalytic combustion element in the combustion chamber. Ideally, the partition acts as a flame barrier for preventing a flame passing from the combustion chamber into the bore of the carrier member in an upstream direction from the combustion chamber.

In one embodiment of the invention the transverse cross-sectional area of the spigot of the soldering tip tool is greater than the transverse cross-sectional area of the soldering tip portion. Advantageously, the transverse cross-sectional area of the spigot of the soldering tip tool is at least 1.05 times the transverse cross-sectional rea of the soldering tip portion, and preferably, the transverse cross-sectional area of the spigot of the soldering tip tool is in the range of 1.1 to 2 times the transverse cross-sectional area of the soldering tip portion, and advantageously, in the range of 1.2 to 1.5 times the transverse cross-sectional area of the soldering tip portion. Alternatively, the transverse cross-sectional area of the spigot of the soldering tip tool is in the range of 0.6 to 1.2 times the transverse cross-sectional area of the soldering tip portion.

In a further embodiment of the invention the catalytic combustion element comprises a carrier defining the bore of the catalytic combustion element, the carrier being coated with a catalyst for converting the fuel gas to heat.

In one embodiment of the invention the carrier is a rigid carrier. In another embodiment of the invention the carrier is of cylindrical shape. Preferably, the carrier is open ended. Advantageously, the carrier is of metal. Ideally, the carrier is of a mesh material.

In one embodiment of the invention the transverse cross-sectional area of the bore defined by the catalytic combustion element is greater than the transverse cross-sectional area of the spigot of the soldering tip tool for facilitating passage of fuel gas between the spigot and the catalytic combustion element.

In another embodiment of the invention the spigot of the soldering tip tool defines with the catalytic combustion element an annular passageway between the spigot and the catalytic combustion element for accommodating fuel gas to the catalytic combustion element.

Preferably, the central bore axis of the catalytic combustion element coincides with the main central axis of the carrier member.

In a further embodiment of the invention the soldering tip tool comprises a main body member defining a central body member axis extending parallel to the main central axis of the carrier member, the soldering tip portion extending from one axial end of the main body member, and the spigot extending from the opposite axial end of the main body member. Preferably, the main body member of the soldering tip tool comprises a plug member which carries the external screw threads for engaging the internal screw threads of the annular receiving member, the spigot extending from the plug member. Advantageously, the plug member and the spigot of the soldering tip tool extend axially from the main body member and are co-axial therewith. Preferably, the soldering tip portion extends axially from the main body member and is co-axial therewith. Ideally, the central body member axis of the soldering tip tool coincides with the main central axis of the carrier member.

In one embodiment of the invention the at least two spanner engaging flats are provided on the main body member.

In a further embodiment of the invention the spigot of the soldering tip tool extends into the bore of the catalytic combustion element to a position just short of the partition for facilitating passage of fuel gas between the partition and an adjacent axial end of the spigot.

In one embodiment of the invention at least one exhaust gas outlet is provided in the carrier member from the combustion chamber for accommodating burnt gases therefrom. Preferably, a plurality of exhaust gas outlets are provided in the carrier member at circumferentially spaced apart intervals around the combustion chamber.

In one embodiment of the invention a plurality of soldering tip tools are provided for selective engagement with the receiving means, the respective soldering tip tools comprising different sizes of soldering tip portions. Preferably, the soldering tip portions of the respective soldering tip tools are of different shapes. Advantageously, at least one of the soldering tip tools comprises a tip portion defining a longitudinally extending cutting edge for forming a heated knife for cutting plastics materials.

In one embodiment of the invention the soldering tool is portable.

In another embodiment of the invention the fuel gas supply means comprises a fuel gas reservoir located in the handle. Preferably, the fuel gas reservoir is rechargeable. Advantageously, the fuel gas reservoir is adapted for receiving fuel gas in liquid form.

In another embodiment of the invention the fuel gas supply means comprises a pressure controller and a flow controller for controlling the pressure and flow rate of fuel gas to the combustion chamber.

Additionally, the invention provides a soldering tip tool for use in the gas powered soldering tool according to the invention, wherein the soldering tip tool comprises a soldering tip portion extending at one end thereof, and an elongated spigot extending at the opposite end thereof for extending into the bore of the catalytic combustion element of the gas powered soldering tool.

In one embodiment of the invention the soldering tip tool comprises a main body member defining a central body member axis for extending parallel to the main central axis of the carrier member when secured therein, the soldering tip portion extending from one axial end of the main body member, and the spigot extending from the opposite axial end of the main body member.

In another embodiment of the invention the main body member comprises a plug member which carries the external screw threads for engaging the internal screw threads of the annular receiving member, the spigot extending from the plug member. Preferably, the plug member and the spigot extend axially from the main body member and are co-axial therewith. Advantageously, the soldering tip portion extends axially from the main body member and is co-axial therewith.

In one embodiment of the invention the central body member axis coincides with the main central axis of the carrier member when the soldering tip tool is secured therein. In another embodiment of the invention the at least two spanner engaging flats are provided on the main body member for facilitating engagement of the main body member with a spanner for rotation thereof relative to the carrier member.

The advantages of the invention are many. The most important advantage of the invention is that it provides a gas powered soldering tool in which the soldering tip tool can be replaced without the need for replacing the gas catalytic combustion element. Furthermore, the gas powered soldering tool according to the invention provides for efficient heat transfer from the catalytic combustion element to the soldering tip portion, and additionally, there is no danger of damage to the catalytic combustion element during replacing of one soldering tip tool with another soldering tip tool.

By virtue of the fact that the soldering tip tool comprises a spigot extending from the soldering tip tool into the bore of the catalytic combustion element, efficient heat transfer from the catalytic combustion element to the soldering tip portion is achieved. Provision of the spigot of transverse cross-sectional area greater than that of the soldering tip portion enhances the efficiency of heat transfer to the soldering tip portion. By virtue of the fact that the soldering tip tool comprises a threaded plug member extending from the main body member of the soldering tip tool and the plug member engages the receiving means, which in turn engages the carrier member, heat transfer efficiency to the soldering tip portion is further enhanced since heat conducted from the combustion chamber by the carrier member is transferred to the main body member, and in turn to the soldering tip portion. The provision of external screw threads on the plug member for engaging corresponding screw threads on the receiving means facilitates ease of removal and replacing a soldering tip tool on the soldering tool with another soldering tip tool.

The provision of the partition has a particularly advantageous and beneficial effect in that it acts to retain combustion chamber debris within the combustion chamber and prevents passage of such debris from the combustion chamber through the carrier member to the fuel gas supply means, which would otherwise damage components of the fuel gas supply means which are located in the handle or in the carrier member. A further advantage of the partition is that the partition also acts as a flame stopper for preventing a flame travelling in an upstream direction through the bore of the carrier member from the combustion chamber into the handle, which would otherwise lead to serious damage to the soldering tool, and could lead to injury to a person using the soldering tool.

Additionally, by virtue of the fact that the catalytic combustion element is located within the combustion chamber in the carrier member, the soldering tip tool can be readily removed and replaced with an alternative soldering tip tool without risk of damage to the catalytic combustion element. The fact that the catalytic combustion element comprises a rigid carrier of cylindrical shape further avoids the risk of damage to the catalytic combustion element since the fact that the carrier is rigid ensures that the catalytic combustion element remains in place during replacement of one soldering tip tool with another. The risk of damage to the catalytic combustion element is further reduced by virtue of the fact that the catalytic combustion element is located and retained in place in the combustion chamber by the receiving means and the partition.

Figure 2:
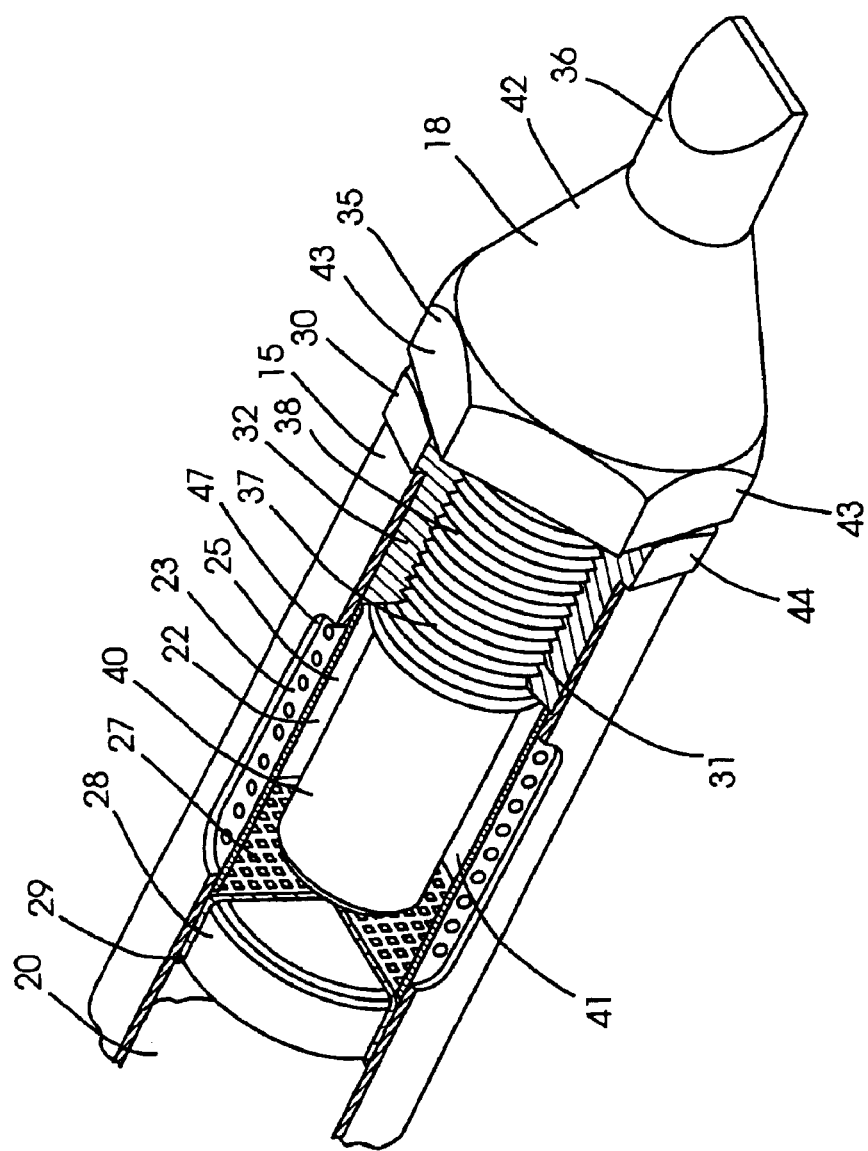
Figures 3, 4:
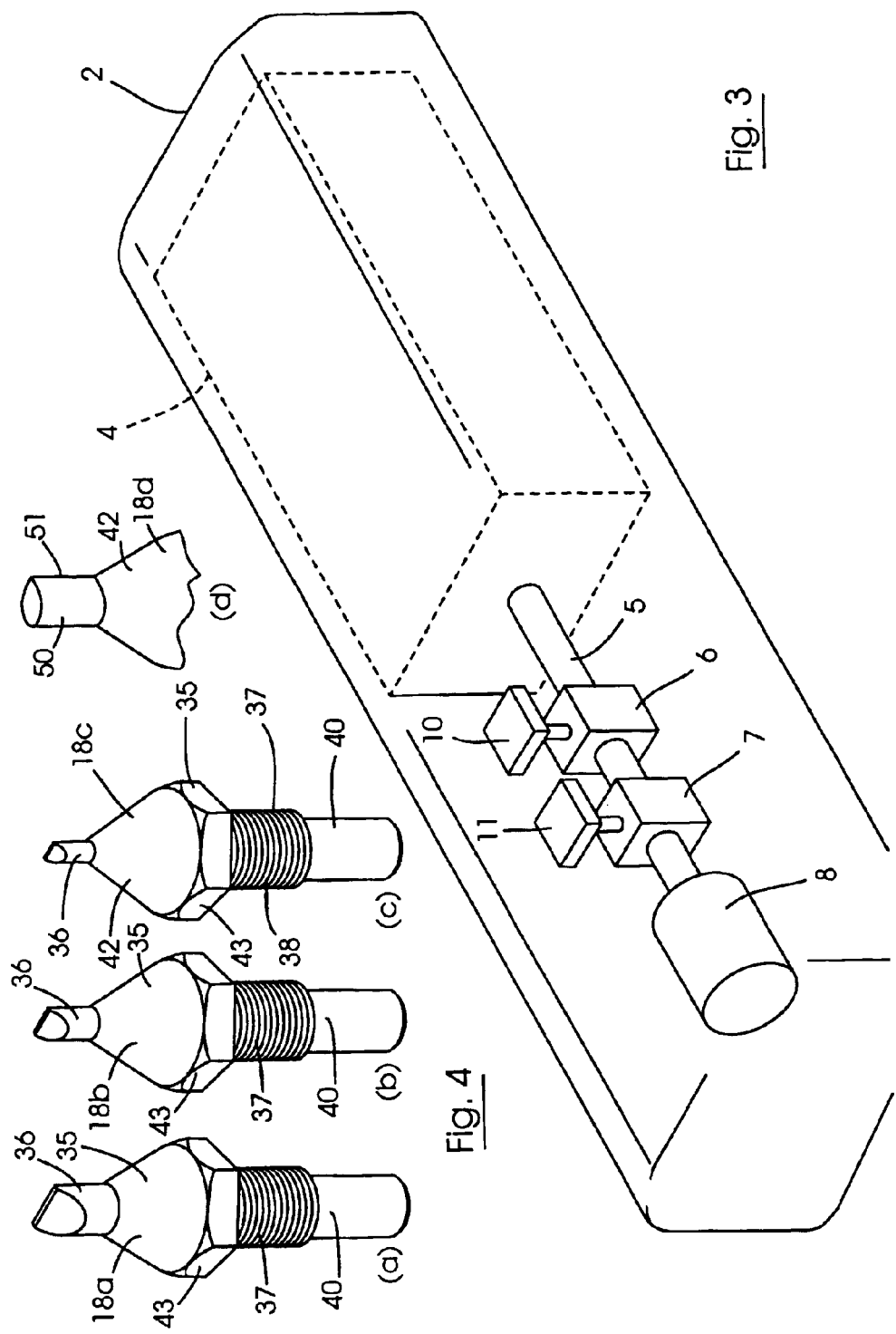

The invention will be more clearly understood from the following description of a preferred embodiment thereof, which is given by way of example only, with reference to the accompanying drawings, in which:

FIG. 1 is a partly cutaway perspective view of a gas powered soldering tool according to the invention, FIG. 2 is a partly cutaway perspective view of a portion of the soldering tool of FIG. 1, FIG. 3 is a partly cutaway and partly schematic perspective view of another portion of the soldering tool of FIG. 1, FIGS. 4(a) to (d) are perspective views of alternative parts for the soldering tool of FIG. 1.

Referring to the drawings, there is illustrated a gas powered soldering tool according to the invention indicated generally by the reference numeral 1, which in this embodiment of the invention is a portable, hand held gas powered soldering tool. The soldering tool 1 comprises a handle 2 of plastics material, and a fuel gas supply means comprising a rechargeable fuel gas reservoir 4 for pressurised liquid fuel gas is located within the handle 2. A fuel gas supply pipe 5 from the fuel gas reservoir 4 delivers fuel gas from the reservoir through a pressure controller 6 and a flow controller 7 to a venturi mixer 8 where the fuel gas is mixed with air to form a fuel gas/air mixture. The pressure and flow controllers 6 and 7 and the venturi mixer 8 are located within the handle 2, and control buttons 10 and 11 on the handle 2 are provided for setting the pressure and flow controllers 6 and 7, respectively, to deliver fuel gas at the desired pressure and flow rates. Such fuel gas reservoirs, pressure and flow controllers as well as control buttons and venturi mixers will be well known to those skilled in the art, and it will be appreciated that in FIG. 3 the reservoir 4, pressure and flow controllers 6 and 7, and the buttons 10 and 11 as well as the venturi mixer 8 are illustrated in schematic form only.

A tubular elongated carrier member 15 of circular transverse cross-section, and of stainless steel material extends from and is secured to the handle 2 by a gland nut 16 and carries a soldering tip tool 18 at a distal end 19 thereof. The carrier member 15 defines an elongated bore 20 which defines a longitudinally extending main central axis 21, and forms at its distal end 19 a combustion chamber 22. A gas catalytic combustion heating element 23 is located within the combustion chamber 22 for converting the fuel gas/air mixture to heat for heating the soldering tip tool 18. The fuel gas/air mixture is delivered into the combustion chamber 22 from the venturi mixer 8 through the bore 20 of the carrier member 15. The catalytic combustion element 23 comprises a rigid cylindrical carrier 24 of perforated metal material which is coated with an appropriate catalyst, and defines an open ended bore 25, the central axis of which coincides with the main central axis 21 of the carrier member 15.

A partition 27 of fine metal mesh material extends transversely across the bore 20 of the carrier member 15 intermediate its ends for defining the combustion chamber 22 towards the distal end 19 of the carrier member 15. A ring 28 is located within the bore 20 of the carrier member 15 and entraps an annular flange 29 extending from the partition 27 between itself and the carrier member 15 for securely retaining and positioning the partition 27 in the carrier member 15. The grade size of the mesh of the partition 27 is such as to facilitate the passage of fuel gas/air mixture from the venturi mixer 8 into the combustion chamber 22, but is of sufficiently small size to retain combustion chamber debris in the combustion chamber 22 for preventing such debris passing through the bore 20 of the carrier member 15 to the venturi mixer 8, where it would otherwise foul the venturi mixer 8 and cause damage or lead to blockages of the fuel gas.

A receiving means comprising an annular receiving member 30 of stainless steel having a bore 31 is located and secured at the distal end 19 of the carrier member 15 for releasably receiving, engaging and securing the soldering tip tool 18 in the carrier member 15. The receiving member 30 forms an interference fit with the carrier member 15, and is secured therein by crimping. Additionally the receiving member 30 forms an inwardly extending flange 32 which extends circumferentially around and into the bore 20 of the carrier member 15 for engaging the catalytic combustion element 23. The flange 32 co-operates with the partition 27 for locating and retaining the catalytic combustion element 23 in the combustion chamber 22.

The soldering tip tool 18 comprises a main body member 35 which defines a geometrical longitudinally extending axis which coincides with the main central axis 21 of the carrier member 15. The body member 35 is of outer diameter substantially similar to the outer diameter of the receiving member 30, which is also of outer diameter substantially similar to that of the carrier member 15. A soldering tip portion 36 extends axially forwardly from one end of the body member 35 for soldering, and a plug member 37 extends axially from the main body member 35 at the opposite end to the soldering tip portion 36 for engaging the receiving member 30. The plug member 37 is provided with external screw threads 38 for co-operating with and engaging corresponding internal screw threads 39 in the bore 31 of the receiving member 30 for securing the soldering tip tool 18 in the receiving member 30. The main body member 35 tapers at 42 to the soldering tip portion 36.

A spigot 40 of circular transverse cross-section extends from the plug 37 into the combustion chamber 22 and in turn into the bore 25 of the catalytic combustion element 23 for transferring heat from the catalytic combustion element 23 to the soldering tip portion 36. The transverse cross-sectional area of the spigot 40 is approximately 8.5 sqmm, and is approximately 1.2 times the transverse cross-sectional area of the soldering tip portion 36 for enhancing heat transfer from the catalytic combustion element 23 to the soldering tip portion 36. Additionally, the internal diameter of the catalytic combustion element 23 is greater than that of the spigot 40 for providing an annular passageway 41 between the spigot 40 and the catalytic combustion element 23 for accommodating the fuel gas/air mixture therebetween for distributing the fuel gas/air mixture over the entire area of the catalytic combustion element 23. The spigot 40 extends into the combustion chamber 22 to a position just short of the partition 27 for accommodating the flow of fuel gas between the partition 27 and the end of the spigot 40 to the annular passageway 41. The diameter of the plug 37 is greater than that of the spigot 40 for further enhancing heat transfer from the spigot, and thus from the catalytic combustion element 23 to the soldering tip portion 36.

Spanner engaging flats 43 are provided on the main body member 35 of the soldering tip tool 18, and spanner engaging flats 44 are also provided on the receiving member 30 for facilitating securing and removal of the soldering tip tool 18 in the receiving member 30.

The soldering tip tool 18 is symmetrical about its central axis, with which the plug member 37, the spigot 40 and the soldering tip portion 36 are co-axial. The soldering tip tool 18 is ideally formed by machining from one piece of material which may be brass or copper or other suitable metals having good heat conducting characteristics. The brass or copper material of the soldering tip tool 18 typically is nickel coated.

A plurality of circumferentially equi-spaced apart axially extending exhaust outlet slots 47 are provided in the carrier member 15 adjacent the combustion chamber 22 for accommodating exhaust gases from the combustion chamber 22.

Referring to FIG. 4, it is envisaged that the soldering tool 1 will be provided with a plurality of soldering tip tools 18 having soldering tip portions 36 of different sizes and shapes for carrying out various different soldering operations. Such soldering tips 18a to 18c are illustrated in FIG. 4. It is also envisaged that one or more tool bits such as the tool bit 18d will be provided, and instead of being provided with a soldering tip portion, the tool bits will be provided with a tip portion 50 having a longitudinally extending cutting edge 51. Such tool bits 18d would be suitable to act as a cutting tool for cutting plastics material in sheet, plate or panel form, or indeed in any other form, and also for cutting ropes of plastics and other materials. When the tool bit 18d is provided, it is envisaged that the transverse cross-sectional area of the tip portion 50 will be less than that of the spigot 40, since less heat is required for cutting plastics sheet than for soldering. Typically, the transverse cross-sectional area of the tip portion 50 will be of the order of 13.8 sqmm, and thus, the transverse cross-sectional area of the spigot 40 will be in the order of 0.6 times the transverse cross-sectional area of the tip portion 50, and in general, would range between 0.4 to 1 times the transverse cross-sectional area of the tip portion.

In use, with a soldering tip tool 18 of the desired type secured in the receiving member 30 and the fuel gas reservoir 4 charged with fuel gas, the soldering tool 1 is ready for use. The control buttons 10 and 11 are operated for supplying fuel gas to the venturi mixer 8 through the pressure controller 6 and the flow controller 7 at the desired pressure and flow rates. Fuel gas/air mixture is delivered from the venturi mixer 8 through the bore 20 of the carrier member 15 to the combustion chamber 22. Initially, the fuel gas/air mixture passes radially through the catalytic combustion element 23 unburnt, since initially the catalytic combustion element 23 is at room temperature, and thus below its ignition temperature. The fuel gas/air mixture passing through the exhaust outlet slots 47 is ignited to burn in a flame in one of the slots 47 by any suitable ignition means, for example, a naked flame of a match or a cigarette lighter or a spark from a flint spark generating mechanism. As the fuel gas/air mixture burns in a flame adjacent the exhaust gas outlet slot 47, the temperature of the catalytic combustion element adjacent the flame in exhaust outlet slot 47 is raised to its ignition temperature and commences to convert the fuel gas/air mixture to heat by catalytic action in flameless combustion, thereby extinguishing the flame. The temperature of the remainder of the catalytic combustion element 23 rapidly rises to its ignition temperature so that the entire catalytic combustion element 23 commences to convert the fuel gas/air mixture to heat by catalytic action in flameless combustion. Exhaust gases from the combustion chamber 22 are exhausted through the exhaust outlet slots 47. Heat from the catalytic combustion element 23 is conducted through the spigot 40 into the plug 37 and in turn through the main body member 35 to the soldering tip portion 36 for carrying out the soldering operation. Heat is also transferred from the catalytic combustion element 23 to the soldering tip portion 36 by conduction through the portion of the carrier member 15 forming the combustion chamber 23 and through the receiving member 30 to the main body member 35 and in turn to the soldering tip portion. Should the soldering tip tool 18 be replaced with a tool bit 18d comprising the tip portion 50, heat is conducted to the tip portion 50 and in turn to the cutting edge 51 in similar fashion.

When it is desired to replace the soldering tip tool 18, the soldering tip tool 18 is unscrewed from the receiving member 30 by engaging respective spanners on the flats 43 and 44 of the soldering tip tool 18 and receiving member 30, respectively, and unscrewing the soldering tip tool 18 from the receiving member 30. Securing of the next selected soldering tip tool 18 to the receiving member 30 is carried out by engaging the plug member 37 in the bore 31 of the receiving member 30 and screwing the plug member 37 into the receiving member 30 by spanners appropriately engaged on the flats 43 and 44 of the soldering tip tool 18 and the receiving member 30, respectively.

While the gas powered soldering tool according to the invention has been described as comprising a handle of a particular construction, it will be readily apparent to those skilled in the art that the soldering tool according to the invention may be provided with a handle of any other suitable or desirable shape or construction. It will also be appreciated that an automatic ignition means may be provided for automatically bringing the catalytic combustion element to its ignition temperature without the need for igniting the fuel gas to burn externally of the combustion chamber in a flame. While particular shapes and construction of soldering tip tool have been described and illustrated, it will of course be readily apparent to those skilled in the art that soldering tip tools having soldering tip portions of other suitable shapes, sizes and construction may be provided.

What is claimed is:

1. A gas powered soldering tool (1) comprising a handle (2), a soldering tip tool (18) having a soldering tip portion (36) extending at one end thereof and an elongated spigot (40) extending at the opposite end thereof, an elongated tubular carrier member (15) extending from the handle (2) for carrying the soldering tip tool (18) at a distal end (19) thereof, the carrier member (15) having an elongated bore (20) extending therethrough defining a main central axis (21), and forming an elongated combustion chamber (22) towards the distal end (19) thereof, a gas catalytic combustion heating element (23) for converting gas to heat for heating the soldering tip tool (18), the catalytic combustion element (23) having a longitudinally extending bore (25) defining a central bore axis, and being located in the combustion chamber (22) with the central bore axis extending parallel to the main central axis (21), a receiving means (30) located at the distal end (19) of the carrier member (15) for receiving and securing the soldering tip tool (18) to the carrier member (15) with the spigot (40) of the soldering tip tool (18) extending into the bore (25) of the catalytic combustion element (23) for transferring heat from the catalytic combustion element (23) to the soldering tip portion (36), and a fuel gas supply means (4, 5, 6, 7, 8) located in the handle (2) for supplying fuel gas to the combustion chamber (22) through the carrier member (15), wherein the receiving means (30) is a releasable receiving means (30) for releasably receiving and securing the soldering tip tool (18) in the carrier member (15).

2. A gas powered soldering tool as claimed in claim 1 wherein the receiving means (30) comprises an annular receiving member (30) having a receiving bore (31) for releasably receiving and engaging the soldering tip tool (18).

3. A gas powered soldering tool as claimed in claim 2 wherein the receiving bore (31) is provided with an internal screw thread (39) for engaging a corresponding external screw thread (38) on the soldering tip tool (18).

4. A gas powered soldering tool as claimed in claim 2 wherein the annular receiving member (30) engages the bore (20) of the carrier member (15), and the carrier member (15) is crimped onto the annular receiving member (30).

5. A gas powered soldering tool as claimed in claim 2 wherein at least a pair of opposite spanner engaging flats (44) are provided on the annular receiving member (30) for facilitating gripping of the annular receiving member (30) with a spanner, and at least a pair of opposite spanner engaging flats (43) are provided on the soldering tip tool (18) for facilitating gripping of the soldering tip tool (18) with a spanner, and for facilitating rotation of the soldering tip tool (18) relative to the annular receiving member (30) for removal of the soldering tip tool (18) from the carrier member (15).

6. A gas powered soldering tool as claimed in claim 1 wherein the receiving means (30) forms a flange (32) extending inwardly into the combustion chamber (22) for locating the catalytic combustion element (23) in the combustion chamber (22).

7. A gas powered soldering tool as claimed in claim 6 wherein the flange (32) formed by the receiving means (30) extends around the soldering tip tool (18).

8. A gas powered soldering tool as claimed in claim 1 wherein a partition (27) is located in and extends across the bore (20) of the carrier member (15) intermediate the ends thereof for permitting passage of fuel gas through the bore (20) of the carrier member (15) into the combustion chamber (22), and for preventing debris from the combustion chamber (22) passing in the reverse direction through the bore (20) of the carrier member (15).

9. A gas powered soldering tool as claimed in claim 8 wherein the partition (27) defines the combustion chamber (22) in the bore (20) of the carrier member (15) towards the distal end (19) thereof.

10. A gas powered soldering tool as claimed in claim 8 wherein the partition (27) co-operates with the receiving means (30) for locating the catalytic combustion element (23) in the combustion chamber (22).

11. A gas powered soldering tool as claimed in claim 8 wherein the partition (27) acts as a flame barrier for preventing a flame passing from the combustion chamber (22) into the bore (20) of the carrier member (15) in an upstream direction from the combustion chamber (22).

12. A gas powered soldering tool as claimed in claim 1 wherein the transverse cross-sectional area of the spigot (40) of the soldering tip tool (18) is greater than the transverse cross-sectional area of the soldering tip portion (36) of the soldering tip tool (18).

13. A gas powered soldering tool as claimed in claim 12 wherein the transverse cross-sectional area of the spigot (40) of the soldering tip tool (18) is at least 1.05 to 2 times the transverse cross-sectional area of the soldering tip portion (36) of the soldering tip tool (18).

14. A gas powered soldering tool as claimed in claim 1 wherein the catalytic combustion element (23) comprises a rigid carrier (24) defining the bore (25) of the catalytic combustion element (23), the carrier (24) being coated with a catalyst for converting the fuel gas to heat.

15. A gas powered soldering tool as claimed in claim 14 wherein the carrier (24) is of cylindrical shape, and is open ended, and is of metal.

16. A gas powered soldering tool as claimed in claim 1 wherein the transverse cross-sectional area of the bore (25) defined by the catalytic combustion element (23) is greater than the transverse cross-sectional area of the spigot (40) of the soldering tip tool (18) for facilitating passage of fuel gas between the spigot (40) and the catalytic combustion element (23).

17. A gas powered soldering tool as claimed in claim 16 wherein the spigot (40) of the soldering tip tool (18) defines with the catalytic combustion element (23) an annular passageway (41) between the spigot (40) and the catalytic combustion element (23) for accommodating fuel gas to the catalytic combustion element (23).

18. A gas powered soldering tool as claimed in claim 1 wherein the soldering tip tool (18) comprises a main body member (35) defining a central body member axis extending parallel to the main central axis (21) of the carrier member (15), the soldering tip portion (36) extending from one axial end of the main body member (35), and the spigot (40) extending from the opposite axial end of the main body member (35).

19. A gas powered soldering tool as claimed in claim 1 wherein a plurality of exhaust gas outlets (47) are provided in the carrier member (15) from the combustion chamber (22) for accommodating burnt gases therefrom, the exhaust gas outlets (47) being provided in the carrier member (15) at circumferentially spaced apart intervals around the combustion chamber (22).

20. A gas powered soldering tool as claimed in claim 1 wherein a plurality of soldering tip tools (18) are provided for selective engagement with the receiving means (30), the respective soldering tip tools (18) comprising different sizes of soldering tip portions (36).

21. A gas powered soldering tool as claimed in claim 20 wherein the soldering tip portions (36) of the respective soldering tip tools (18) are of different shapes.

22. A gas powered soldering tool as claimed in claim 20 wherein at least one of the soldering tip tools (18) comprises a tip portion (50) defining a longitudinally extending cutting edge (51) for forming a heated knife for cutting plastics materials.

23. A gas powered soldering tool as claimed in claim 1 wherein the soldering tool (1) is portable, and the fuel gas supply means (4, 5, 6, 7, 8) comprises a fuel gas reservoir (4) located in the handle (2).

24. A soldering tip tool for use in the gas powered soldering tool as claimed in claim 1 wherein the soldering tip tool (18) comprises a soldering tip portion (36) extending at one end thereof, and an elongated spigot (40) extending at the opposite end thereof for extending into the bore (25) of the catalytic combustion element (23) of the gas powered soldering tool (1).

25. A soldering tip tool as claimed in claim 24 wherein the soldering tip tool (18) comprises a main body member (35) defining a central body member axis for extending parallel to the main central axis (21) of the carrier member (15) when secured therein, the soldering tip portion (36) extending from one axial end of the main body member (35), and the spigot (40) extending from the opposite axial end of the main body member.

* * * * *